(12) United States Patent
Peng

(10) Patent No.: US 11,391,457 B2
(45) Date of Patent: Jul. 19, 2022

(54) SEGREGATED STEAM SYSTEM AND PROCESS IN A HYDROGEN PRODUCTION FACILITY

(71) Applicant: Air Products and Chemicals, Inc., Allentown, PA (US)

(72) Inventor: Xiang-Dong Peng, Lake Mary, FL (US)

(73) Assignee: Air Products and Chemicals, Inc., Allentown, PA (US)

( * ) Notice: Subject to any disclaimer, the term of this patent is extended or adjusted under 35 U.S.C. 154(b) by 139 days.

(21) Appl. No.: 16/529,854

(22) Filed: Aug. 2, 2019

(65) Prior Publication Data

US 2021/0033275 A1  Feb. 4, 2021

(51) Int. Cl.
*F22B 1/16* (2006.01)
*C01B 3/38* (2006.01)

(52) U.S. Cl.
CPC ................. *F22B 1/16* (2013.01); *C01B 3/388* (2013.01); *C01B 2203/0233* (2013.01); *C01B 2203/0833* (2013.01)

(58) Field of Classification Search
CPC ............ C01B 2203/0894; C01B 3/388; C01B 2203/0833; C01B 2203/0233; C01B 2203/0495; C01B 2203/0883
See application file for complete search history.

(56) References Cited

U.S. PATENT DOCUMENTS

| 9,556,026 | B1 | 1/2017 | Davis et al. |
| 9,586,819 | B2 | 3/2017 | Xu et al. |
| 2016/0332876 | A1* | 11/2016 | Xu ....................... B01D 53/047 |

* cited by examiner

*Primary Examiner* — Jafar F Parsa
(74) *Attorney, Agent, or Firm* — Jason Michael Ploeger

(57) ABSTRACT

A segregated steam system and process in a hydrogen production facility wherein boiler feed water is heated by indirect heat exchange with a reformate, the heated boiler feed water is used to heat water condensate formed from the reformate, the heated water condensate is passed to a first steam drum for producing steam for a reformer feed gas mixture, and a second portion of the heated boiler feed water is passed to a second steam drum for producing steam for export.

8 Claims, 1 Drawing Sheet

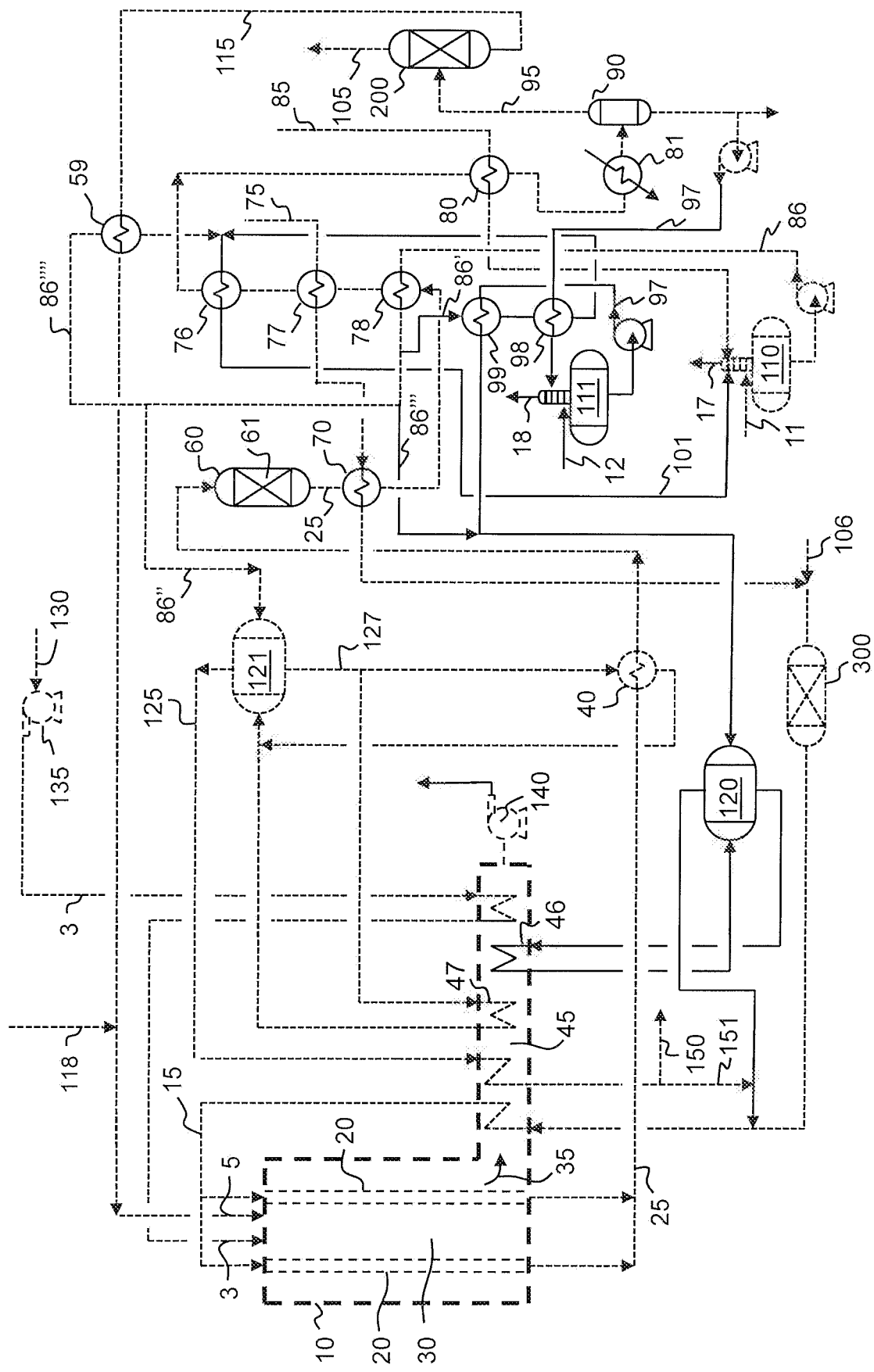

SEGREGATED STEAM SYSTEM AND PROCESS IN A HYDROGEN PRODUCTION FACILITY

BACKGROUND

The present disclosure relates to steam production in hydrogen production facility, and more particularly steam production using a segregated steam system and process.

In most, if not all, catalytic steam-hydrocarbon reforming systems and processes, the reformate produced by the reformer is cooled to condense water, and process condensate removed from the reformate before the water-depleted reformate is separated in a pressure swing adsorption unit.

Typically, the process condensate is treated in a stripper to remove chemical impurities, and then combined with make-up water, where the combined water stream is sent to a single steam system for generating steam for use in the process and for export.

Process condensate, even after treatment in a stripper, may contain residual organic compounds making steam produced from the process condensate unsatisfactory for export steam in some cases.

As a result, systems and processes have been developed that use segregated steam systems and processes. In segregated steam systems and processes, two separate steam drums are used to segregate the boiler feed water that contains process condensate from the boiler feed water formed only from make-up water. The advantage of using a separate steam drum for the process condensate and a separate steam drum for boiler feed water formed from make-up water is to prevent the organic compounds from getting into the export steam. Steam formed from the process condensate may be used to form the reactant feed gas mixture to the catalytic steam-hydrocarbon reformer, where the presence of the organic compounds can be easily tolerated.

Segregated steam systems and processes have been proposed that require a redesign of the heat exchange network of the hydrogen production facility.

U.S. Pat. No. 9,586,819 discloses systems and processes with and without segregated steam systems and processes.

U.S. Pat. No. 9,556,026 discloses systems and processes with segregated steam systems and processes.

Industry desires a segregated steam system and process that can be easily retrofitted into existing heat exchange networks in hydrogen production facilities.

In addition, industry desires segregated steam systems and processes that offer high thermal efficiency.

BRIEF SUMMARY

The present disclosure relates to a process and system for producing steam in a segregated steam system in a hydrogen production facility.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing steam in a segregated steam system in a hydrogen production facility, the process comprising:
(a) heating boiler feed water (86) by indirect heat exchange with a reformate (25) (in heat exchange section (78));
(b) heating water condensate (97) formed from the reformate by indirect heat exchange with a first portion (86') of the heated boiler feed water (86) from step (a) (in heat exchange section (98));
(c) passing the water condensate from step (b) to a first steam drum (120) for producing steam for a reformer feed gas mixture (15); and
(d) passing a second portion (86") of the boiler feed water (86) from step (a) to a second steam drum (121) for producing steam for export (150).

Aspect 2. The process as in aspect 1 further comprising:
(e) cooling the reformate (25) from step (a) in an amount effective to condense at least a portion of the water in the reformate to form condensed water and a water-depleted reformate gas (95);
(f) separating the condensed water from the water-depleted reformate gas (95) in a separator (90) thereby forming the water condensate (97) from at least a portion of the condensed water from step (e).

Aspect 3. The process as in aspect 2 further comprising:
passing the water-depleted reformate gas (95) to a pressure swing adsorption unit (200); and
separating the water-depleted reformate gas (95) in the pressure swing adsorption unit (200) to form a hydrogen product gas (105) and a by-product gas (115).

Aspect 4. The process as in any one of aspects 1 to 3 further comprising:
passing the water condensate (97) to a first deaerator (111) prior to passing the water condensate to the first steam drum (120).

Aspect 5. The process as in aspect 4 wherein the water condensate (97) is heated by the first portion (86') of the heated boiler feed water (86) from step (a) (in heat exchange section (98)), subsequently passed to the deaerator (111), and then subsequently heated again by the first portion (86') of the heated boiler feed water (86) (in heat exchange section (99)).

Aspect 6. The process as in aspect 5 wherein the first portion (86') of the boiler feed water heats the water condensate (97) passed from the deaerator (111) (in heat exchange section (99)) before the first portion (86') heats the water condensate passed to the deaerator (111) (in heat exchange section (98)).

Aspect 7. The process as in any one of aspects 1 to 6 further comprising:
passing the first portion (86') of the boiler feed water (86) to a second deaerator (110).

Aspect 8. The process as in any one of aspects 1 to 7 further comprising:
passing a third portion (86''') of the boiler feed water (86) from step (a) to the first steam drum (120).

Aspect 9. The process as in any one of aspects 1 to 8 further comprising:
passing the boiler feed water (86) from the second deaerator (110) to a first heat exchange section (78) for heating the boiler feed water (86) by indirect heat exchange with the reformate (25) in step (a).

Aspect 10. A segregated steam-producing system in a hydrogen production facility, the steam-producing system comprising a first heat exchange section (78) operatively constructed to provide indirect heat exchange between a reformate (25) and boiler feed water (86) to heat the boiler feed water (86);

a second heat exchange section (98) operatively constructed to provide indirect heat exchange between water condensate (97) formed from the reformate (25) and a first portion (86') of the boiler feed water (86) from the first heat exchange section (78);

a first steam drum (120) operatively constructed to receive the water condensate (97) from the second heat exchange section (98); and a second stream drum (121) operatively constructed to receive a second portion (86") of the boiler feed water (86) from the first heat exchange section (78).

Aspect 11. The system as in aspect 10 further comprising:

a third heat exchange section (81) operatively constructed to cool the reformate (25) from the first heat exchange section (78) and condense at least a portion of the water in the reformate to form condensed water and a water-depleted reformate gas (95); and a separator (90) having an inlet operatively constructed to receive the reformate from the third heat exchange section (81), a first outlet configured to discharge the water condensate (97) formed from the condensed water, and a second outlet configured to discharge the water-depleted reformate gas (95).

Aspect 12. The system as in aspect 11 further comprising:

a pressure swing adsorption unit (200) operatively constructed to receive the water-depleted reformate (95) from the second outlet of the separator (90).

Aspect 13. The system as in any one of aspects 10 to 12 further comprising:

a first deaerator (111) operatively constructed to receive the water condensate (97) from the second heat exchange section (98), and wherein the first steam drum (120) is operatively constructed to receive the water condensate (97) from the first deaerator (111).

Aspect 14. The system as in aspect 13 further comprising:

a fourth heat exchange section (99) operatively constructed to receive the water condensate (97) from the first deaerator (111), and wherein the first steam drum (120) is operatively constructed to receive the water condensate (97) from the fourth heat exchange section (99).

Aspect 15. The system as in any one of aspects 10 to 14 further comprising:

a second deaerator (110) operatively constructed to receive the first portion (86') of the boiler feed water (86).

Aspect 16. The system as in any one of aspects 10 to 15 wherein the first steam drum (120) is operatively constructed to receive a third portion (86''') of the boiler feed water (86) from the first heat exchange section (78).

BRIEF DESCRIPTION OF SEVERAL VIEWS OF THE DRAWINGS

The FIGURE is a process flow diagram for a hydrogen production facility with a segregated steam system according to the present disclosure.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

In this specification, unless expressly otherwise indicated, the word 'or' is used in the sense of an operator that returns a true value when either or both of the stated conditions are met, as opposed to the operator 'exclusive or' which requires only that one of the conditions is met.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

The at least a portion of a material may have the same composition as the material from which it is derived. The at least a portion of a material may include all or only specific components of the material from which it is derived. A material may be subjected to one or more material processing steps, for example chemical treatment and/or physical treatment, to form the at least a portion of that material.

As used herein, "first," "second," "third," etc. are used to distinguish from among a plurality of steps and/or features, and is not indicative of the total number, or relative position in time and/or space unless expressly stated as such.

In order to aid in describing the invention, directional terms may be used in the specification and claims to describe portions of the present invention (e.g., upper, top, lower, bottom, left, right, etc.). These directional terms are merely intended to assist in describing and claiming the invention and are not intended to limit the invention in any way. In addition, reference numerals that are introduced in the specification in association with a drawing FIGURE may be repeated in one or more subsequent figures without additional description in the specification in order to provide context for other features.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

The terms "depleted" or "lean" mean having a lesser mole % concentration of the indicated component than the original stream from which it was formed. "Depleted" does not mean that the stream is completely lacking the indicated component.

The terms "rich" or "enriched" mean having a greater mole % concentration of the indicated component than the original stream from which it was formed.

As used herein, "indirect heat transfer" or "indirect heat exchange" is heat transfer from one stream to another stream where the streams are not mixed together. Indirect heat transfer includes, for example, transfer of heat from a first fluid to a second fluid in a heat exchanger where the fluids are separated by plates or tubes. Indirect heat exchange includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat exchange from the first fluid to a second fluid using a working fluid may be accommodated using a heat pipe, thermosyphon, kettle boiler, or the like.

As used herein, "direct heat transfer" or "direct heat exchange" is heat transfer from one stream to another stream where the streams are intimately mixed together. Direct heat transfer includes, for example, humidification where water is sprayed directly into a hot air stream and the heat from the air evaporates the water.

As used herein, "in fluid flow communication" means operatively connected by one or more conduits, manifolds, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

Downstream and upstream refer to the intended flow direction of the process fluid transferred. If the intended flow direction of the process fluid is from the first device to the second device, the second device is in downstream fluid flow communication of the first device. In case of a recycle stream, downstream and upstream refer to the first pass of the process fluid.

Illustrative embodiments of the invention are described below. While the invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

The present disclosure relates to a segregated steam system and process in a hydrogen production facility. The system and process are described with reference to the FIGURE, which is a process flow diagram of a hydrogen production facility with the segregated steam system according to the present disclosure.

A description of the hydrogen production system and process is provided to provide context for the segregated steam system and process of the present disclosure.

The hydrogen production system includes a catalytic steam-hydrocarbon reformer 10 where the process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or simply syngas, as used herein is any mixture comprising hydrogen and carbon monoxide. Reformate often also comprises water. The reforming reaction is an endothermic reaction and may be described generally as $C_nH_m + n\ H_2O \rightarrow n\ CO + (m/2 + n)\ H_2$. Hydrogen is generated when reformate is generated.

The hydrogen production process comprises introducing a reformer feed gas mixture 15 into a plurality of catalyst-containing reformer tubes 20 in a reformer furnace 10, reacting the reformer feed gas mixture 15 in a reforming reaction under reaction conditions effective to form a reformate 25 comprising $H_2$, CO, $CH_4$, and $H_2O$, and withdrawing the reformate 25 from the plurality of catalyst-containing tubes 20 of the reformer furnace 10.

The reformer feed gas mixture 15 may be any feed gas mixture suitable for introducing into a catalytic steam-hydrocarbon reformer for forming a reformate. The reformer feed gas mixture 15 comprises at least one hydrocarbon and steam. The at least one hydrocarbon may be methane. The reformer feed gas mixture 15 is formed from a reformer feed 75 and steam 151. The reformer feed 75 may be heated in one or more heat exchangers 70 and 77 by indirect heat exchange with reformate 25. The reformer feed may be desulphurized in a hydrodesulphurization unit 300 with hydrogen 106 added for hydrodesulphurization. Hydrogen 106 may be provided from the hydrogen-containing product gas 105. The reformer feed gas mixture may be prereformed; formed by reacting the reformer feed 75 and steam 151 in a prereformer (not shown). The reformer feed 75 may be formed from a hydrocarbon feed, which may be natural gas, methane, naphtha, propane, refinery fuel gas, refinery off-gas, other suitable hydrocarbon feed known in the art, or combinations thereof.

The reforming reaction takes place in the plurality of catalyst-containing reformer tubes 20 in reformer furnace 10. A reformer furnace, also called a catalytic steam reformer, steam methane reformer, and steam-hydrocarbon reformer, is defined herein as any fired furnace used to convert feedstock containing elemental hydrogen and carbon into reformate by a reaction with steam over a catalyst with heat provided by combustion of a fuel.

Reformer furnaces with a plurality of catalyst-containing reformer tubes, i.e. tubular reformers, are well-known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 25 in the plurality of catalyst-containing reformer tubes 20 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The reformate 25 may exchange heat with a number of streams and may then be passed to a shift reactor 60 containing shift catalyst 61. The reformate 25 withdrawn from the plurality of catalyst-containing reformer tubes 20 may be passed to heat exchanger 40 (a so-called waste heat boiler) where the reformate 25 heats a portion of boiler feed water stream 127 thereby forming a two-phase water and steam stream that is reintroduced into steam drum 121.

Reformate 25 may be passed from heat exchanger 40 to shift reactor 60. The hydrogen production process may comprise reacting the reformate 25 from heat exchanger 40 in the presence of a shift catalyst 61 under reaction conditions effective to form additional hydrogen in the reformate 25. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The reaction conditions effective to form additional hydrogen in the reformate 25 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. One or more shift reactors may be used.

After passing through the shift reactor 60, the reformate 25 may be passed to heat exchanger 70 where hydrocarbon feedstock 75 is heated and reformate 25 is cooled.

The reformate 25 may be further cooled by heat exchange with other streams until water is condensed from the reformate. Water in the reformate is separated from a water-depleted reformate 95 in separator 90.

The system may comprise a pressure swing adsorption unit 200 operatively constructed to receive the water-depleted reformate 95 from the separator 90. The water-depleted reformate 95 is passed to a pressure swing adsorption unit 200. The water-depleted reformate 95 is separated in the pressure swing adsorption unit 200 to form a hydrogen product 105 and a by-product or tail gas 115.

The fuel 5 may comprise by-product gas 115 from pressure swing adsorber 200 and a supplemental fuel 118. By-product gas from a pressure swing adsorber is often called pressure swing adsorber tail gas, and supplemental fuel is often called trim fuel. The by-product gas 115 and supplemental fuel 118 may be heated before being used as fuel 5. By-product gas 115 and supplemental fuel 118 may be blended and introduced together through a burner to the combustion section, or they may be introduced separately through different ports in the burner. Alternatively, the by-product gas may be introduced through the primary burner and the supplemental fuel may be introduced through lances near the burner.

Fuel 5 may be combusted with an oxidant gas 3 in a combustion section 30 of the reformer furnace 10 external to the plurality of catalyst-containing reformer tubes 20 under conditions effective to combust the fuel 5 to form a combustion product gas 35 comprising $CO_2$ and $H_2O$. Any suitable burner may be used to introduce the fuel 5 and the oxidant gas 3 into the combustion section 30. Combustion of the fuel 5 with the oxidant gas 3 generates heat to supply energy for reacting the reformer feed gas mixture 15 inside the plurality of catalyst-containing reformer tubes 20. The combustion product gas 35 is withdrawn from the combustion section 30 of the reformer furnace 10 and passed to the convection section 45 of the reformer furnace to supply heat to other process streams. The combustion section (also called the radiant, radiation, or radiative section) of the reformer furnace is that part of the reformer furnace containing the plurality of catalyst-containing reformer tubes. The convection section of the reformer furnace is that part of the reformer furnace containing heat exchangers other than the plurality of catalyst-containing reformer tubes. The heat exchangers in the convection section may be for heating process fluids other than reformate, such as water/steam, air, pressure swing adsorption unit by-product gas, reformer feed gas prior to introduction into the catalyst-containing reformer tubes, etc.

The oxidant gas 3 is a gas containing oxygen and may be air, oxygen-enriched air, oxygen-depleted air such as gas turbine exhaust, industrial grade oxygen, or any other oxygen-containing gas known for use in a reformer furnace for combustion. For example, as shown in the FIGURE, air 130 may be compressed in forced draft fan 135, heated by combustion product gas 35 in the convection section 45, and passed to the reformer furnace as oxidant gas 3.

Combustion product gas 35 may heat a number of different process streams in the convection section 45 of the reformer furnace 10. The combustion product gas 35 may heat the streams in various different configurations (order of heating).

Heat exchange section 81 may be operatively constructed to cool the reformate 25 from the shift reactor 60 and condense at least a portion of the water in the reformate to form condensed water and a water-depleted reformate gas 95. Heat exchange section 81 is often referred to as a trim cooler and may be air-cooled or water-cooled. Separator 90 has an inlet operatively constructed to receive the reformate 25 from heat exchange section 81 (i.e. the separator is in downstream fluid flow communication of heat exchange section 81). Separator 90 has a first outlet configured to discharge the water condensate 97 formed from the condensed water, and a second outlet configured to discharge the water-depleted reformate gas 95.

In the process for producing steam, the reformate 25 may be cooled in an amount effective to condense at least a portion of the water in the reformate 25 to form condensed water and a water-depleted reformate gas 95. Condensed water is separated from the water-depleted reformate gas 95 in separator 90, thereby forming water condensate 97 from at least a portion of the condensed water.

The segregated steam-producing system according to the present disclosure comprises heat exchanger section 78 operatively constructed to provide indirect heat exchange between the reformate 25 from shift reactor 60 and boiler feed water 86 to heat the boiler feed water 86 and cool reformate 25. The boiler feed water 86 may be passed from deaerator 110 via a pump as shown in the FIGURE.

Reformate 25 is passed to heat exchange section 78 after the reformate has passed through heat exchanger 70. Boiler feed water 86 is heated and reformate 25 is cooled in heat exchange section 78. The process for producing steam in a segregated steam system in a hydrogen production facility comprises heating boiler feed water 86 by indirect heat exchange with reformate 25 (e.g. in heat exchange section 78).

The segregated steam-producing system comprises heat exchange section 98 operatively constructed to provide indirect heat exchange between water condensate formed from the reformate 25 and a first portion 86' of the boiler feed water 86 from the heat exchange section 78. The first portion 86' may be a divided portion of boiler feed water 86.

In the process for producing steam, water condensate 97 from the reformate 25 is heated by indirect heat exchange with the first portion 86' of the heated boiler feed water 86.

Boiler feed water 86 contains very low concentrations (e.g. less than 5 ppm by weight) of organic compounds compared to the water condensate 97 derived by the condensation of at least a portion of the water present in the reformate 25. Treatment of raw water to make boiler feed water is well-known and is described, for example, in *Marks' Mechanical Engineers' Handbook*, 6$^{th}$ Edition, Theodore Baumeister (ed.), McGraw-Hill Book Co., 1958, pp 9-46 through 9-51.

A deaerator 111 may be operatively constructed to receive the water condensate 97 from heat exchange section 98. Deaerator 111 is in downstream fluid flow communication of heat exchange section 98.

In the process for producing steam, water condensate 97 may be passed to deaerator 111 prior to passing the water condensate 97 to steam drum 120.

As used herein a "deaerator" is any device that removes dissolved gases from water with the assistance of steam. The steam may be introduced or formed in-situ. The manufacture and operation of deaerators are well-known.

Low pressure steam 12 may be introduced to assist with degassing water streams introduced into deaerator 111. Vent stream 18 is withdrawn.

From deaerator 111, water condensate 97 may be passed to heat exchange section 99 to be heated by the first portion 86' of the heated boiler feed water 86. Heat exchange section 99 may be operatively constructed to receive the water condensate 97 from deaerator 111. Heat exchange section 99 may be in downstream fluid flow communication of deaerator 111.

The segregated steam-producing system comprises steam drum 120, which is operatively constructed to receive water condensate 97 from heat exchange section 98 (e.g. via deaerator 111 and via heat exchange section 99). Steam drum 120 is in downstream fluid flow communication of heat exchange section 98 with respect to the flow of water condensate 97.

In the process for producing steam, water condensate 97 that was heated by indirect heat exchange with the first portion 86' of the heated boiler feed water 86 is passed to steam drum 120 for producing steam for reformer feed gas mixture 15.

Steam drum 120 receives water condensate 97 from deaerator 111. Steam produced in steam drum 120 is used as reformer feed and not used for export steam. Any contaminants, such as methanol, ammonia, and formic acid, fail to have any serious detrimental effects when used in the reformer feed.

Steam drum 120 generally receives a portion 86''' of the heated boiler feed water 86 along with the water condensate 97, since water condensate alone is not sufficient for reactant steam required in the reformer feed gas mixture 15. The first steam drum 120 may be operatively constructed to receive a third portion 86''' of the boiler feed water 86 from the first heat exchange section 78. The third portion 86''' of the heated boiler feed water 86 may be passed to steam drum 120. The third portion 86''' may be a divided portion of boiler feed water 86.

Heat to raise steam from steam drum 120 may be provided by passing boiler feed water from steam drum 120 to a heat exchange section 46 in the convection section 45 of the reformer furnace to exchange heat with combustion product gases 35.

The segregated steam-producing system comprises steam drum 121 operatively constructed to receive a second portion 86'' of the boiler feed water 86 from heat exchange section 78. Steam drum 121 is in downstream fluid flow communication of heat exchange section 78 with respect to the flow of the second portion 86'' of the boiler feed water 86. The second portion 86'' may be a divided portion of the boiler feed water 86.

In the process for producing steam, a second portion 86'' of the boiler feed water 86 that was heated by indirect heat exchange with the reformate 25 is passed to steam drum 121 for producing steam for export 150.

Steam drum 121 receives little and preferably none of the water condensate 97. In this way, the export steam will not contain any of the contaminants present in the water condensate 97.

Heat to raise steam from steam drum 121 may be provided by passing boiler feed water from steam drum 121 to a heat exchange section 47 in the convection section 45 of the reformer furnace to exchange heat with combustion product gases 35. Steam 125 withdrawn from steam drum 121 may be superheated by indirect heat exchange with combustion product gas 35 in the convection section 45 of the reformer furnace 10.

The heat exchange section 47 for raising steam for steam drum 121 may be upstream of the heat exchange section 46 for raising steam for steam drum 120 (as shown in the FIGURE). Alternatively, the positions of the two heat exchange sections can be switched.

The segregated steam-producing system may also include deaerator 110. Deaerator 110 may be operatively constructed to receive make-up water 85. Make-up water 85 may be heated in heat exchange section 80 by indirect heat exchange with reformate 25 prior to being passed to deaerator 110. Make-up water is specially treated water for use in the boiler feed water system.

Deaerator 110 may also be operatively constructed to receive the first portion 86' of the boiler feed water 86. Deaerator 110 may be in downstream fluid flow communication of heat exchange section 98. As shown in the FIGURE, after heating the water condensate 97 in heat exchange section 98, the first portion 86' of the boiler feed water 86 may be heated by indirect heat exchange with reformate 25 in heat exchange section 76 and then passed to deaerator 110 as part of stream 101.

A fourth portion 86'''' of the boiler feed water 86 may be used to heat the by-product gas 115 in heat exchange section 59. The fourth portion 86'''' of the boiler feed water 86 may be heated along with first portion 86' in heat exchange section 76 prior to passing the fourth portion 86'''' of the boiler feed water 86 to deaerator 110 as part of stream 101. The fourth portion 86'''' may be a divided portion of the boiler feed water 86.

Low pressure steam 11 may be introduced into deaerator 110 to assist with degassing water streams introduced into deaerator 110. Vent stream 17 is withdrawn from deaerator 110.

Example

The segregated steam system and process of the present disclosure has been compared to a standard product cycle disclosed in FIG. 3 of U.S. Pat. No. 9,586,819. Both cycles have the same reformate 25 heat exchange design (i.e. heat exchange sections 40, 70, 78, 77, 76, 80, and 81). The thermal efficiencies of the system and process of the present disclosure and FIG. 3 of U.S. Pat. No. 9,586,819 are substantially identical. The equipment cost increase from the base cycle shown in FIG. 3 of U.S. Pat. No. 9,586,819 to the cycle shown in the FIGURE of the present disclosure is about 1%. For comparison, the equipment cost increase from the base cycle shown in FIG. 3 of U.S. Pat. No. 9,586,819 to the segregated steam cycle shown in FIG. 2 of U.S. Pat. No. 9,586,819 is about 4%.

U.S. Pat. No. 9,556,026 acknowledged that the thermal efficiency of the segregated steam system and process was slightly less than comparable processes that are not suitable for cold climate operation.

What is claimed is:

1. A process for producing steam in a segregated steam system in a hydrogen production facility, the process comprising:
   (a) heating boiler feed water by indirect heat exchange with a reformate;
   (b) heating water condensate formed from the reformate by indirect heat exchange with a first portion of the heated boiler feed water from step (a);
   (c) passing the water condensate from step (b) to a first steam drum for producing steam for a reformer feed gas mixture; and
   (d) passing a second portion of the boiler feed water from step (a) to a second steam drum for producing steam for export.

2. The process as claimed in claim 1 further comprising:
   (e) cooling the reformate from step (a) in an amount effective to condense at least a portion of the water in the reformate to form condensed water and a water-depleted reformate gas;
   (f) separating the condensed water from the water-depleted reformate gas in a separator thereby forming the water condensate from at least a portion of the condensed water from step (e).

3. The process as claimed in claim 2 further comprising:
passing the water-depleted reformate gas to a pressure swing adsorption unit; and
separating the water-depleted reformate gas in the pressure swing adsorption unit to form a hydrogen product gas and a by-product gas.

4. The process as claimed in claim 1 further comprising:
passing the water condensate to a first deaerator prior to passing the water condensate to the first steam drum.

5. The process as claimed in claim 4 wherein the water condensate is heated by the first portion of the heated boiler feed water from step (a), subsequently passed to the deaerator, and then subsequently heated again by the first portion of the heated boiler feed water.

6. The process as claimed in claim 5 wherein the first portion of the boiler feed water heats the water condensate passed from the deaerator before the first portion heats the water condensate passed to the deaerator.

7. The process as claimed in claim 1 further comprising:
passing the first portion of the boiler feed water to a second deaerator.

8. The process as claimed in claim 1 further comprising:
passing a third portion of the boiler feed water from step (a) to the first steam drum.

* * * * *